United States Patent
Lin

(10) Patent No.: US 9,653,946 B2
(45) Date of Patent: May 16, 2017

(54) POWER DISTRIBUTION SYSTEM

(71) Applicant: Wistron Corporation, New Taipei (TW)

(72) Inventor: Yung-Mei Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 444 days.

(21) Appl. No.: 14/334,669

(22) Filed: Jul. 18, 2014

(65) Prior Publication Data

US 2015/0280491 A1    Oct. 1, 2015

(30) Foreign Application Priority Data

Mar. 25, 2014   (TW) .............................. 103111088 A

(51) Int. Cl.
*G06F 1/26*  (2006.01)
*G06F 1/32*  (2006.01)
(Continued)

(52) U.S. Cl.
CPC .............. *H02J 9/061* (2013.01); *G06F 1/263* (2013.01); *G06F 1/30* (2013.01); *H02J 7/00* (2013.01);
(Continued)

(58) Field of Classification Search
None
See application file for complete search history.

(56) References Cited

U.S. PATENT DOCUMENTS 6,839,214 B2   1/2005  Berberich
7,991,588 B1*  8/2011  Krieger ................... G06F 1/26
                                                  702/186
(Continued)

FOREIGN PATENT DOCUMENTS

CN    1747280      3/2006
TW    201312899    3/2013

OTHER PUBLICATIONS

"Office Action of Taiwan Counterpart Application" with partial English translation, issued on Mar. 11, 2016, p. 1-p. 6.
(Continued)

*Primary Examiner* — Jared Fureman
*Assistant Examiner* — Aqeel Bukhari
(74) *Attorney, Agent, or Firm* — Jianq Chyun IP Office

(57) ABSTRACT

A power distribution system includes at least one server and a power distribution unit coupled to the at least one server. The power distribution unit includes a power distribution controller and a power input unit, a battery and a power switcher coupled to the power distribution controller. The power distribution controller detects a voltage of an alternating current (AC) received from power source by the power input unit. If the voltage is greater than a first threshold and smaller than a second threshold, the power distribution controller switches the power switcher to be coupled to the power input unit, and provides the alternating current (AC) to the at least one server. Conversely, the power distribution controller switches the power switcher to be coupled to the battery, and provides a direct current (DC) to the at least one server. Accordingly, power consumption and waste during power supply may be effectively reduced.

6 Claims, 4 Drawing Sheets

(51) Int. Cl.
*H02J 7/00* (2006.01)
*H02J 9/06* (2006.01)
*G06F 1/30* (2006.01)

(52) U.S. Cl.
CPC ......... *G06F 1/3212* (2013.01); *Y02B 60/1292* (2013.01); *Y10T 307/367* (2015.04)

(56) References Cited

U.S. PATENT DOCUMENTS

| | | | | |
|---|---|---|---|---|
| 2006/0072531 A1* | 4/2006 | Ewing | ................ | H04L 12/2854 370/338 |
| 2007/0278860 A1* | 12/2007 | Krieger | ................... | H02J 9/061 307/64 |
| 2012/0013186 A1* | 1/2012 | Sarti | ......................... | G06F 1/30 307/23 |
| 2013/0057072 A1 | 3/2013 | Wang et al. | | |
| 2014/0035376 A1* | 2/2014 | Li | ............................ | G06F 1/30 307/66 |

OTHER PUBLICATIONS

"Office Action of China Counterpart Application" with partial English translation, issued on Sep. 27, 2016, p. 1-p. 9.

* cited by examiner

POWER DISTRIBUTION SYSTEM

CROSS-REFERENCE TO RELATED APPLICATION

This application claims the priority benefit of Taiwan application serial no. 103111088, filed on Mar. 25, 2014. The entirety of the above-mentioned patent application is hereby incorporated by reference herein and made a part of this specification.

Field of the Invention

The invention relates to a power management technology, and more particularly, the invention relates to a power distribution system capable of dynamically switching sources of power supply in order to supply power to a power distribution system of a server system.

Description of Related Art

With rapid development of Internet and technology as well as improved software and hardware technologies, many corporations have higher and higher demands on Information Technology (IT) services. Thus, an integrated computer system having high speed computations and huge storage capacity in combination with several servers through Internet is widely popular for corporations. However, owing to electronic components having strong functions, high speeds and large scales in the information technology, it takes a great amount and stabilized power source for maintaining normal operations of a server system of a data center.

FIG. 1 is a schematic structural diagram illustrating a power distribution system configured for supplying stabilized power source to a data center by using an uninterruptible power system (UPS).

With reference to FIG. 1, in general, the conventional power distribution system maintains a normal operation of an information technology service by supplying a backup alternating current (AC) uninterruptedly to a server system of a data center through an UPS in case of abnormal voltages (i.e., power outages, under voltage, or interference). The power supply theory of the UPS is to convert an alternating current (AC) of a supply mains into a direct current (DC) and to charge batteries equipped within the UPS when the supply mains is normally operated. In case that the UPS detects abnormal voltages or breakout of the supply mains, the UPS converts the direct current (DC) stored in the batteries into the alternating current (AC) and supplies the alternating current (AC) for continuing operations, so as to achieve a function of uninterruptible power. However, in a process of converting currents by the UPS and transmitting power source to a power distribution unit (PDU), power supply efficiency is decreased and power consumption is increased. Hence, an issue of solving additional power consumption due to decreased conversion efficiency has become one of essential topics for researchers and developers in the field.

SUMMARY OF THE INVENTION

The invention provides a power distribution system capable of switching power source to be supplied to a server to power source of a battery through a power distribution unit equipped with the battery when the supplied power source is detected to be breakout or abnormal, so as to effectively decrease consumed power during power supply.

The invention provides a power distribution system, which includes at least one server and a power distribution unit coupled to the at least one server. The power distribution unit includes a power distribution controller and a power input unit, a battery and a power switcher coupled to the power distribution unit, wherein the power input unit is configured for receiving an alternating current (AC) from a power source, the battery is configured for providing a direct current (DC), and the power distribution controller is configured for detecting a voltage of the alternating current (AC) received by the power input unit. If the voltage is greater than a first threshold and smaller than a second threshold, then the power distribution controller switches the power switcher to be coupled to the power input unit and provides the alternating current (AC) to the at least one server. Conversely, if the voltage is smaller than a first threshold or larger than a second threshold, then the power distribution controller switches the power switcher to be coupled to a battery and provides the direct current (DC) to the at least one server, wherein the second threshold is greater than the first threshold.

In an embodiment of the invention, the at least one server includes at least one power supply unit, wherein the power supply unit is configured for converting an alternating current (AC) or a direct current (DC) into a low-voltage direct current (DC).

In an embodiment of the invention, the power distribution unit further includes a charger. The charger is coupled to a power input unit and is configured for charging a battery.

In an embodiment of the invention, the power distribution system further includes a rack management unit configured for communicating with the power distribution unit through a network interface. Specifically, the rack management unit is further configured for monitoring the at least one server through the power distribution unit.

In an embodiment of the invention, the network interface includes one of an Ethernet, an inter-integrated circuit (i2C) and a RS485 transmission interface.

In an embodiment of the invention, the power distribution controller is further configured for obtaining a status of a battery and activating the battery according the status.

In view of the above, the power distribution unit of the invention is capable of dynamically selecting a supplied power source to distribute an alternating current (AC) or a direct current (DC) to a server, and replacing a conventional uninterruptible power system (UPS) with the power distribution unit equipped with a battery, so as to effectively solve an issue of additional power consumption generated by the uninterruptible power system (UPS). Accordingly, a server of a data center may operate normally under a structure and operations of the power distribution system of the invention, and an operating efficiency of an entire system is increased to a maximum. On another aspect, a configuration of the power distribution system elaborated in embodiments of the invention may help save energy and effectively reduce costs for equipments.

To make the aforesaid features and advantages of the invention more comprehensible, several embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In order to enhance efficiency of supplying power to a data center and a server system of an information technology service, the invention replace a conventional uninterruptible power system (UPS) by dynamically switching the supplied power through a power distribution unit equipped with a battery, such that additional power consumption may be reduced. In this way, efficiency of power supply may be improved.

Figure 2:
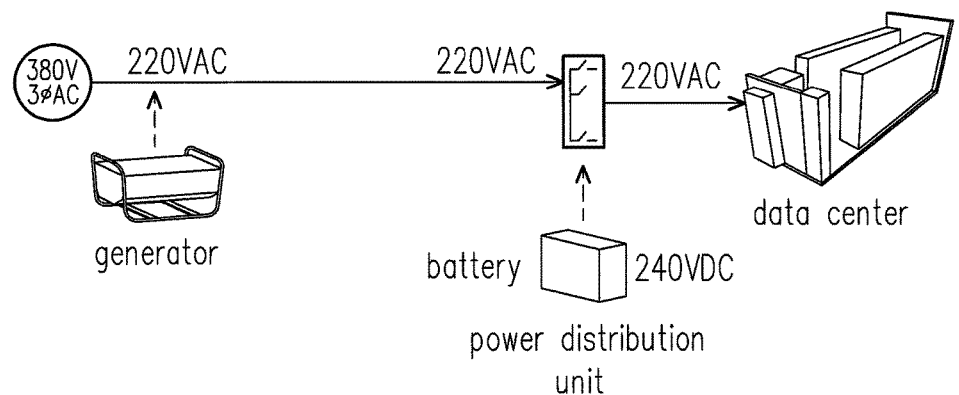
FIG. 2 is a schematic drawing illustrating a structure of a power distribution system according to an exemplary embodiment of the invention.

FIG. 2 is a schematic drawing illustrating a structure of a power distribution system according to an exemplary embodiment of the invention.

Figure 1:
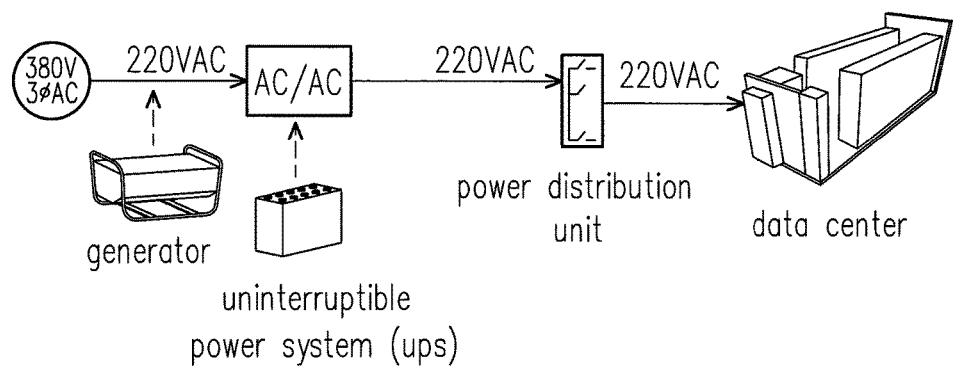
FIG. 1 is a schematic structural diagram illustrating a power distribution system configured for supplying stabilized power source to a data center by using an uninterruptible power system (UPS).

With reference to FIG. 2, the power distribution system as shown in FIG. 2 distributes power source received by a generator to each of servers of a data center through a power distribution unit equipped with a battery. Compared with a power distribution system as shown in FIG. 1, an uninterruptible power system (UPS) as shown in FIG. 1 is replaced by the power distribution unit equipped with the battery so as to avoid issues of additional power consumption and low efficiency caused by the uninterruptible power system (UPS).

Figure 3:
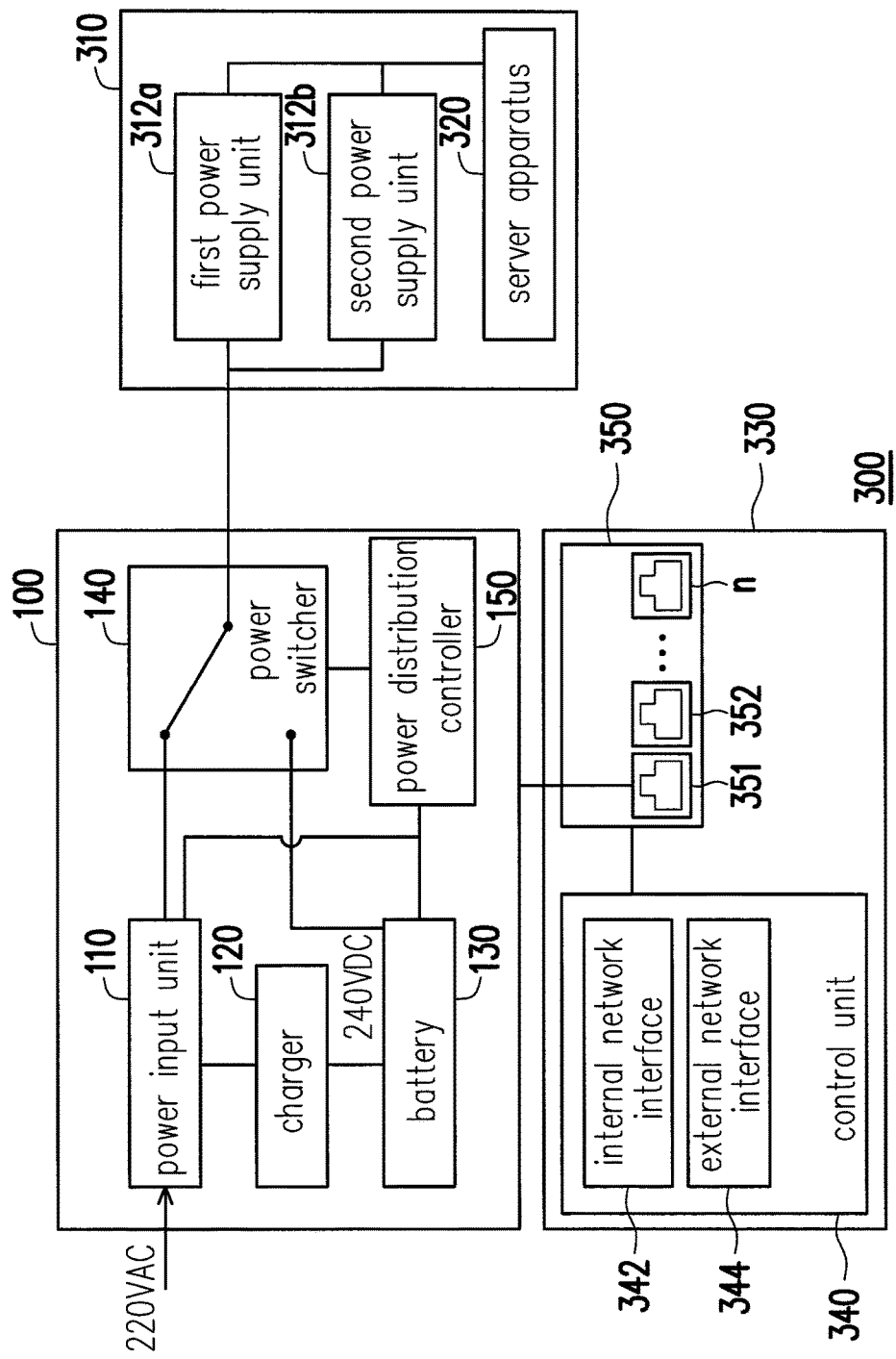
FIG. 3 is a schematic block diagram illustrating an outline of a power distribution system according to an exemplary embodiment of the invention.

FIG. 3 is a schematic drawing illustrating an outline of a power distribution system according to an exemplary embodiment of the invention.

With reference to FIG. 3, a power distribution system 300 includes a power distribution unit 100, a server 310, and a rack management unit 330. It has to be understood that the present embodiment is illustrated by taking a server as an example, but the invention is not limited herein. For example, the power distribution unit 100 may also be coupled to a plurality of servers, and distribute power source to the plurality of servers. To say it further, the power distribution system 300 may include a plurality of power distribution units, and each of the power distribution units may be coupled to at least one server.

The power distribution unit 100 includes a power input unit 110, a charger 120, a battery 130, a power switcher 140, and a power distribution controller 150.

The power input unit 110 is configured for receiving an alternating current (AC) from an external power source (i.e., supply mains).

The charger 120 is coupled to the power input unit 110 and is configured for charging the battery 130 with the alternating current (AC) received by the power input unit 110. The battery 130 is configured for supplying a direct current (DC).

It is worth mentioning that, in an exemplary embodiment of the invention, the power distribution unit 100 equipped with the battery 130 is installed at both sides of a rack in a zero U installation manner to save space for the rack.

The power distribution controller 150 is coupled to the power input unit 110, the battery 130, and the power switcher 140, and is configured for detecting a voltage of the alternating current (AC) received by the power input unit 110. Specifically, when the detected voltage is greater than a first threshold and smaller than a second threshold, the power distribution controller 150 switches the power switcher 140 to be coupled to the power input unit 110, and provides the alternating current (AC) to the server 310. Namely, when the power distribution controller 150 detects that the voltage of the alternating current (AC) provided by the power input unit 110 is normal, the alternating current (AC) provided by the power input unit 110 is used as a supplied power. Conversely, if the detected voltage is smaller than the first threshold or greater than the second threshold, then the power distribution controller 150 switches the power switcher 140 to be coupled to the battery 130, and provides the direct current (DC) to the server 310. Here, the second threshold is greater than the first threshold.

For example, a generator generally provides a voltage of 220 volts (V) alternating current (AC). Therefore, in an exemplary embodiment of the invention, the power distribution controller 150 would initially set a first threshold as 80% of 220V AC (i.e., 176V AC) so as to be deemed as a minimum value for determining whether a voltage of an alternative current (AC) received by the power input unit 110 is abnormal. Similarly, the power distribution controller 150 would initially set a second threshold as 180% of 220V AC (i.e., 324V AC) so as to be deemed as a maximum value for determining whether a voltage of an alternative current (AC) received by the power input unit 110 is abnormal. However, the invention is not limited herein, as the first threshold and the second threshold may also be adjusted and set up according to an overall operation of the power distribution unit 100.

Figure 4:
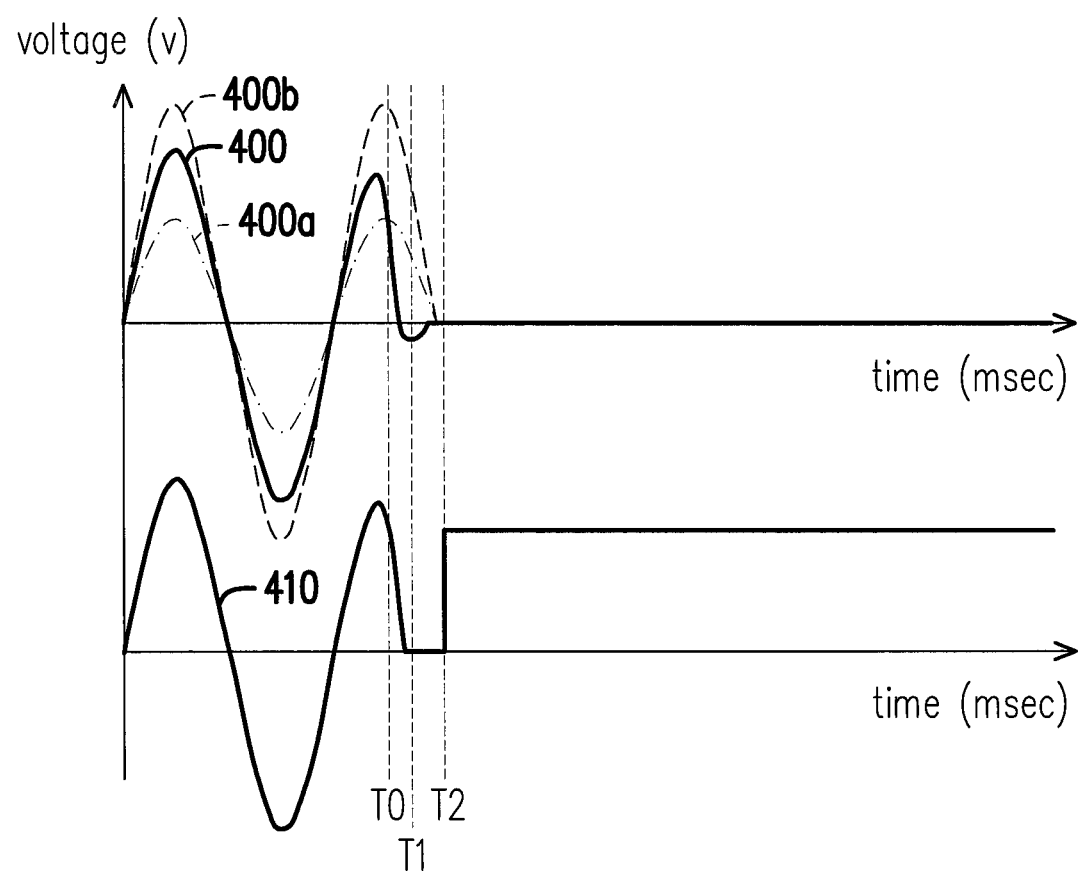
FIG. 4 is an oscillogram illustrating an input voltage and an output voltage detected by a power distribution controller according to an exemplary embodiment of the invention.

FIG. 4 is an oscillogram illustrating an input voltage and an output voltage detected by a power distribution controller according to an exemplary embodiment of the invention.

With reference to FIG. 4, an input voltage 400 represents voltage variations of an alternating current (AC) received by the power input unit 110, and an output voltage 410 represents voltage variations of power source outputted to the server 310 from the power distribution unit 100. Specifically, the power distribution controller 150 detects a voltage of an alternating current (AC) received by the power input unit 110, and determines that the detected input voltage 400 is greater than a first threshold 400a and smaller than a second threshold 400b before a time point T0. Accordingly, the power distribution controller 150 switches the power switcher 140 to be coupled to the power input unit 110, and provides the alternating current (AC) (i.e., the output voltage 410 before the time point T0) to the server 310. If the power distribution controller 150, at the time point T0, determines that the detected input voltage 400 is smaller than the first threshold 400a and also determines that such an abnormal status has continued for a period of time (the time point T0~a time point T1), then the power distribution controller 150 switches the power switcher 140 to be coupled to the battery 130, and provides a direct current (DC) (i.e., the output voltage 410 after a time point T2) to the server 310, wherein a switching time for the power switcher 140 falls between the two time points T1 and T2.

Particularly, in a mechanism that the power distribution controller 150 dynamically switches an alternating current (AC) and a direct current (DC) according to an input voltage, the alternating current (AC) and the direct current (DC) are transmitted by the same power line to the server 310 from the power distribution unit 100. Accordingly, costs for equipments may be reduced.

With reference to FIG. 3 again, the server 310 includes a first power supply unit 312a and a second power supply unit 312b. When the server 310 receives an alternating current (AC) or a direct current (DC) provided by the power distribution unit 100, the server 310 converts a received power source into a low-voltage direct current (DC) (i.e., 12V) through the first power supply unit 312a or the second power supply unit 312b, and provide the low-voltage direct current (DC) to a server apparatus 320, so as to maintain normal operations of the server 310. For example, the server apparatus 320 includes a host, a storage, an exchanger, a motherboard and a backup power supply unit, and so on. It is worth mentioning that two power supply units (the first power supply unit 312a and the second power supply unit 312b) are provided in the server 310, such that one power supply unit may continue supply power source to a server in order to maintain normal operations when the other power supply unit breaks down or is no longer operational. However, the invention is not limited herein. In the present exemplary embodiment, one or more than two power supply units may also be arranged in the server.

A rack management unit 330 includes a control unit 340 and an exchanger 350. The control unit 340 includes an internal network interface 342 and an external network interface 344. Accordingly, the control unit 340 may be coupled to a network controller (not illustrated) in the exchanger 350 via the internal network interface 342, and may be connected to the power distribution unit 100 through a network connection port 351 with a network interface provided by the network controller, so as to communicate with the power distribution unit 100. For example, a network interface may be an Ethernet, an inter-integrated circuit (i2C) or a RS485 transmission interface. Specifically, with the connection, the rack management unit 330 may deliver a control signal, transmit environmental information parameters, or adjust a server's peripheral equipment (not illustrated) according to the received environmental information parameters to the power distribution unit 100, wherein the environmental information parameters are, for example, real-time information such as currents, voltages, temperatures, and a hardware status of a server as well as environmental parameters. For example, a peripheral equipment is an environmental cooling apparatus such as a fan, and a water cooler equipment. Therefore, the rack management unit 330 may adjust usages of the peripheral equipment according to environmental information parameters received by the power distribution unit 100. In other words, after initializing, the rack management unit 330 may detect whether the power distribution unit 100 is present. Namely, the rack management unit 330 may detect whether the power distribution unit 100 is coupled to the corresponding network connection port 351. Afterwards, the rack management unit 330 may monitor the server 310 through the power distribution unit 100.

In addition, the control unit 340 of the rack management unit 330 may also communicate with an external network via the external network interface 344 so as to acquire an operation status of the server 310. For example, the external network interface 344 may be connected to another exchanger at which the server 310 is located.

It is worth mentioning that, in an exemplary embodiment of the invention, the power distribution controller 150 may obtain a status of the battery 130 and activate the battery 130 according to the status, such that the battery 130 is maintained at an optimized status and a lifetime thereof is prolonged.

Figure 5:
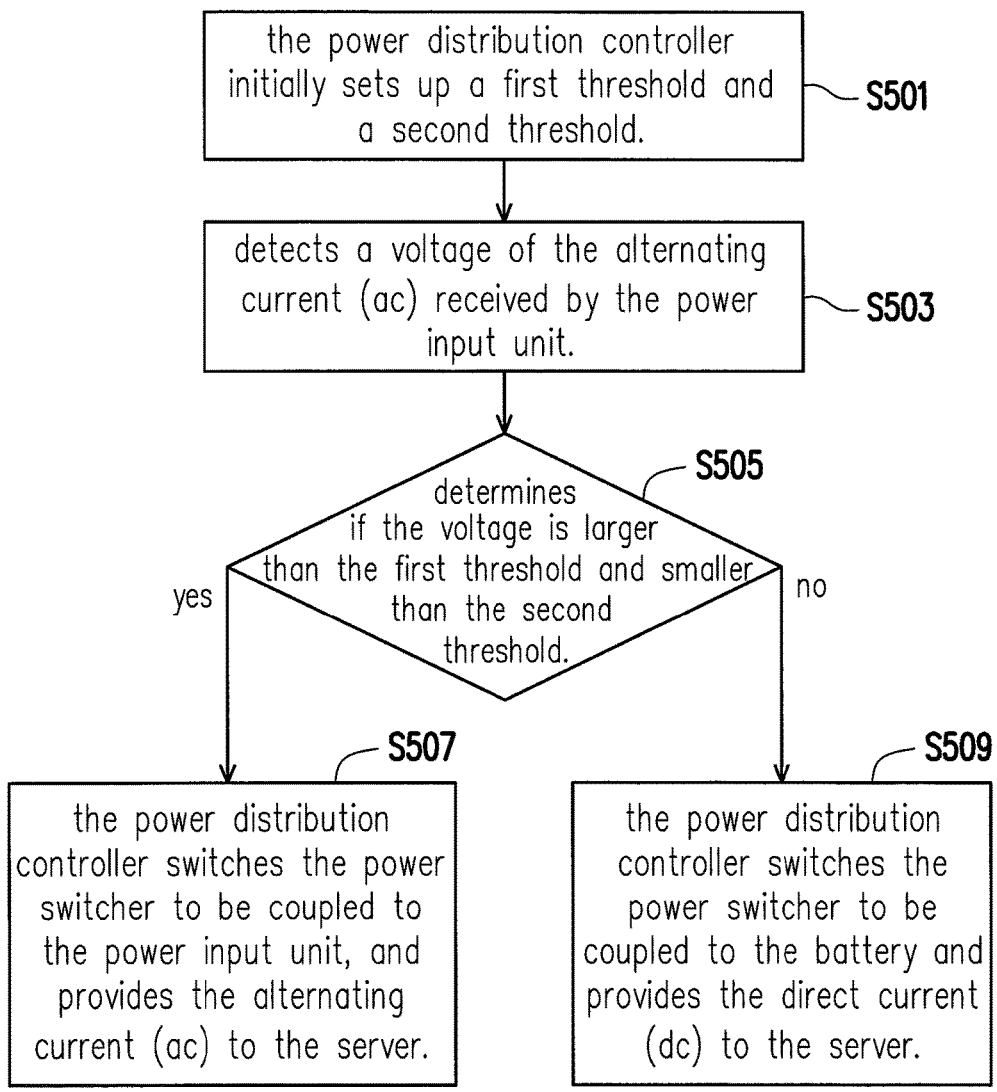
FIG. 5 is a flowchart illustrating an operation of a power distribution system according to an exemplary embodiment of the invention.

FIG. 5 is a flowchart illustrating an operation of a power distribution system according to an exemplary embodiment of the invention.

With reference to FIG. 5, first, in Step S501, the power distribution controller 150 initially sets up a first threshold and a second threshold.

Next, in Step S503, the power distribution controller 150 detects a voltage of the alternating current (AC) received by the power input unit 110.

In Step S505, the power distribution controller 150 determines if the voltage is larger than the first threshold and smaller than the second threshold. If the voltage is greater than the first threshold and smaller than the second threshold, Step S507 is processed.

In Step S507, the power distribution controller 150 switches the power switcher 140 to be coupled to the power input unit 110, and provides the alternating current (AC) to the server 310.

In Step S505, if the power distribution controller 150 determines that a voltage is neither larger than the first threshold nor smaller than the second threshold (i.e., when a voltage is smaller than the first threshold or larger than the second threshold), then in Step S509, the power distribution controller 150 switches the power switcher 140 to be coupled to the battery 130 and provides the direct current (DC) to the server 310.

To sum up, when the power distribution system of the invention detects a breakout or abnormal power supply, the power distribution system switches a supplied power to distribute a direct current (DC) provided by a battery of the power distribution unit through the power distribution unit equipped with the battery, thereby effectively solving an issue of additional power consumption generated due to adopting a conventional uninterruptible power system (UPS) and enhancing power supply efficiency. Furthermore, the power distribution system of the invention may effectively reduce costs for equipments by arranging a power line shared by a direct current (DC) and an alternating current (AC), and by a mechanism of activating a battery. Moreover, the power distribution system of the invention may maintain an operation of a server's peripheral equipment by further determining and detecting a status of a server.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A power distribution system, comprising:
   at least one server; and
   a power distribution unit coupled to the at least one server, wherein the power distribution unit comprises:
   a power input unit configured for receiving an alternating current (AC) from a power source;

a battery configured for providing a direct current (DC);

a power distribution controller coupled to the power input unit and the battery, and configured for detecting a voltage of the alternating current (AC); and a power switcher coupled to the power distribution controller, wherein, if the voltage is greater than a first threshold and smaller than a second threshold, the power distribution controller is further configured for switching the power switcher to be coupled to the power input unit and providing the alternating current (AC) to the at least one server, wherein, if the voltage is smaller than the first threshold or larger than the second threshold, the power distribution controller is further configured for switching the power switcher to be coupled to the battery and providing the direct current (DC) to the at least one server, wherein the second threshold is greater than the first threshold.

2. The power distribution system as claimed in claim 1, wherein the at least one server comprises at least one power supply unit, wherein the power supply unit is configured for converting the alternating current (AC) or the direct current (DC) into a low-voltage direct current (DC).

3. The power distribution system as claimed in claim 1, wherein the power distribution unit further comprises:

a charger coupled to the power input unit and configured for charging the battery.

4. The power distribution system as claimed in claim 1, further comprising:

a rack management unit configured for communicating with the power distribution unit through a network interface, wherein the rack management unit is further configured for monitoring the at least one server through the power distribution unit.

5. The power distribution system as claimed in claim 4, wherein the network interface comprises one of an Ethernet, an inter-integrated circuit (i2C) and a RS485 transmission interface.

6. The power distribution system as claimed in claim 1, wherein the power distribution controller is further configured for acquiring a status of the battery and activating the battery according to the status.

* * * * *